United States Patent [19]

Martens et al.

[11] 4,437,631
[45] Mar. 20, 1984

[54] DRIVE FOR LEADING EDGE FLAPS OF AIRCRAFT WINGS

[75] Inventors: Wilhelm Martens, Delmenhorst; Homayoun Dilmaghani, Gessel, both of Fed. Rep. of Germany

[73] Assignee: Vereinigte Flugtechnische Werke Fokker GmbH, Bremen, Fed. Rep. of Germany

[21] Appl. No.: 141,008

[22] Filed: Apr. 17, 1980

[30] Foreign Application Priority Data

Apr. 20, 1979 [DE] Fed. Rep. of Germany ....... 2916040

[51] Int. Cl.³ .............................................. B64C 3/50
[52] U.S. Cl. ................................... 244/214; 244/210
[58] Field of Search .............. 244/213, 214, 215, 219, 244/75 R, 210, 211; 74/660, 674

[56] References Cited

U.S. PATENT DOCUMENTS

| | | | |
|---|---|---|---|
| 1,472,199 | 10/1923 | Thomson | 244/210 |
| 2,191,839 | 12/1937 | Zap | 244/215 |
| 2,222,935 | 11/1940 | Chilton | 244/215 |
| 2,381,681 | 8/1945 | Maxwell | 244/211 |
| 2,383,102 | 8/1945 | Zap | 244/213 |
| 2,702,676 | 2/1955 | Delaney | 244/210 |
| 2,740,597 | 4/1956 | Wittman | 244/214 |
| 3,263,946 | 8/1966 | Roberts et al. | 244/75 R |
| 3,640,150 | 2/1972 | Leiner et al. | 74/674 |
| 3,831,886 | 8/1974 | Burdges et al. | 244/214 |
| 4,159,089 | 6/1979 | Cole | 244/214 |

Primary Examiner—Trygve M. Blix
Assistant Examiner—Thomas J. Brahan
Attorney, Agent, or Firm—Ralf H. Siegemund

[57] ABSTRACT

A leading edge slat of an aircraft wing is connected to the ends of two rods each of them being linked to a crank arm which, in turn, is swung over a particular angular range by means of a planetary gear being driven by a common shaft. Arcuate guide rails on the slat run in rolls which are journalled on the wing case.

2 Claims, 1 Drawing Figure

U.S. Patent  Mar. 20, 1984  4,437,631
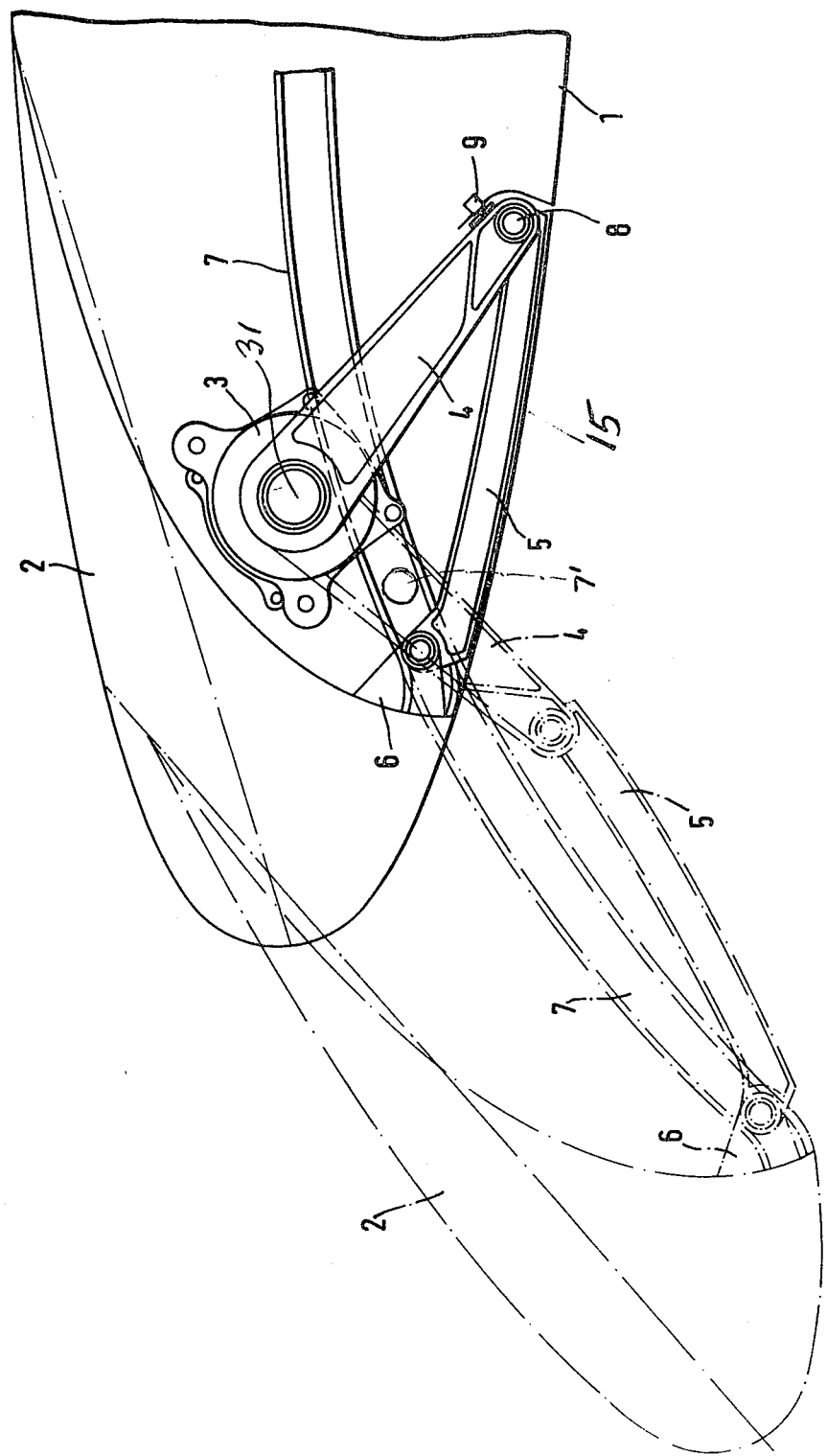

DRIVE FOR LEADING EDGE FLAPS OF AIRCRAFT WINGS

BACKGROUND OF THE INVENTION

The present invention relates to aircraft; and more particularly, the invention relates to the wing construction of an aircraft.

Modern aircraft are equipped with wings having leading edge slats which are advanced during takeoff and landing for increasing the lift. They are also termed "high-lift devices." These leading edge slats are provided, for example, with arc-shaped rails engaging guide elements, such as rolls, mounted on the wing. The slats can be moved into the desired position under utilization of a suitable drive which may include a gear spindle in each instance.

It was found that this type of guiding and drive system for leading edge slats poses problems. For example, the drive spindles are quite long. They project deeply into the wing when the slats are retracted. This complicates the wing construction because the interior of the wing is occupied to a large extent by the fuel tanks. The tanks, of course, must be kept separated from tubular sheaths receiving the spindles. Moreover, these spindles are driven by means of transmission gears. The spindle pitch differs with distance from the fuselage in order to obtain a constant gap width between the slat and the remainder of the wing.

Another version for such leading edge wing slats and their drive and moving mechanism is disclosed in German printed patent application No. 23,55,723. The device as described therein includes pivot drives for two leading edge slats per wing. The slats are positioned and moved by means of cranks, but without direct forward component of movement as in the case of a rail system. In particular, one slat is just pivoted about a fixed pivot point on the wing case, and another slat is folded up having a pivot point on the first slat. As a consequence, lift is augmented by such a slat arrangement to a minor extent only because the overall advance of the slat is smaller. Actually, the advance is the result of employing two slats, whereby pivoting the inner slat advances to a minor extent the pivotal point of the second slat.

The particular drive system disclosed in the publication is not suitable for actually advancing the leading edge slat out of the main wing case.

DESCRIPTION OF THE INVENTION

It is an object of the present invention to provide a new and improved drive system for a leading edge slat in an aircraft wing.

It is another object of the present invention to provide a drive system for leading edge slats which permits employment of a common rotational input for several slats.

In accordance with the preferred embodiment of the present invention, it is suggested to use a common drive shaft along the span of the wing and to use at least one gear per leading edge slat, preferably, a planetary gear driving a crank arm; a thrust rod has one end pivotally linked to the crank arm while its other end is pivotally linked to the leading edge slat; an arc-shaped or arcuate guide rail is also connected to that slat and is guided and held by a roll which is journalled to the wing.

It can thus be seen that the inventive drive and actuating mechanism combines a rail guiding system with a rather simple crank-type drive. It was found to be of particular advantage that one does not have to provide sheaths for spindles. Moreover, the drive system lacks sensitivity to dirt and erosion because there are no open bearing surfaces.

The gear can be provided with a no back device and overload protection means such as a torque limiter; the former, to prevent actuation of the slat by external air pressure in case of driving shaft failure. The torque limiter prevents damage to the drive system, in case the rail guide should be blocked.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which the FIGURE is a schematic section view into the leading edge portion of an aircraft wing incorporating structure in accordance with the preferred embodiment of the invention for practicing the best mode thereof.

Proceeding now to the detailed description of the drawings, the FIGURE shows the front portion of a wing 1 whose leading edge is actually defined by a slat 2. The slat is placed and held in a retracted position by means of several linkage systems, one being shown in the FIGURE; the other ones are of similar construction. Preferably, there are two linkage systems per slat.

The illustrated linkage system as well as others include each an arm or thrust rod 5 whose front end is pivotally linked to a lug or flange 6 of slat 2. The arm or rod 5 actually sits on, and is secured to, a contour sheet 15 which constitutes part of the wing's surface and skin. The cover or sheet 15 covers a gap or slot in the skin of the wing, being open when the slat is protracted and rod 5 swings down. The other end of rod 5 is pivotally linked (pivot 8) to the end of a crank arm 4. The pin 8 is disposed for permitting an eccentric mounting and establishing the respective linkage point.

Crank 4 is driven by a planetary gear system 3 by being, for example, connected to the spider or plant carrier of that gear system while a common drive shaft 31 drives the sun gear of this gear set as well as of others along the span of the wing. This drive shaft 31 is thus common to all the various planetary gear and slat systems, driving crank arms such as crank arm 4 for pivoting the respective rods 5.

The leading edge slat 2 is additionally provided with arc-shaped or arcuate rails, such as rail 7, which extend concentrically to the axis about which slat 2 pivots. Rail 7 and others engage rolls such as roll 7' being journalled to wing case 1 to guide the rail and, thereby, the pivot action of slat 2.

The planetary gear system 3 can include a no back device and a torque-limiting device. Should the common drive for shaft 31 fail, slat 2 should not be moved by the external air pressure. Also, the guide rail 7 may be blocked for some reason or other. Limiting the torque that can be exerted is a safeguard against breakage.

The FIGURE shows the particular slat 2 in retracted position. If the slat is to be advanced, crank 4 is driven via gear 3 in clockwise direction, causing the right-hand portion of rod 5 to swing down; but the rod is also shifted to the left, which causes the slat to be moved out and down. The motion is guided by rail 7 which runs in roll 7'.

Each leading edge slat of a wing is preferably driven by two or even more of such gear-plus-crank-plus-rod systems. All leading edge slats are driven by the common shaft 31, as stated earlier. One can still use the same type of planetary gear sets for all of these drives. However, geometrically, the extent of advance of a slat portion varies (is reduced) with distance from the fuselage. This variation is established simply by chosing different lengths for the cranks. The angular speed and crank-turning angle are the same, the proportional gap between protracted slat or slats and wing case is reduced by reducing the crank arm length as stated.

The dash-dot lines in the FIGURE show the fully protracted and advanced position of the slat as well as the final position of the linkage system including the crank arm 4.

The eccentrically disposed pivot pin 8, linking crank 4 and rod 5, as well as a stop 9 at the structure of wing 1 permit accurate adjustment of the position of rod 5 relative to wing contour sheet 15. Rod 5 is, in particular, aligned with the shape of the wing.

The two pivot links at the ends of rod 5 are provided to permit compensation of variations in the length of flap 2, resulting from variations in temperature, oscillations in the structure, etc.

It can readily be seen that the guide and drive system can be installed in a wing leading edge section without encountering any significant problems. The system does have the advantages outlined above.

The invention is not limited to the embodiments described above; but all changes and modifications thereof, not constituting departures from the spirit and scope of the invention, are intended to be included.

We claim:

1. In a wing for an aircraft and having one or more leading edge slats, there being a common drive shaft for the slats, a drive and actuating mechanism comprising:
   gear means, drivingly connected to the drive shaft;
   a crank arm connected to be driven by the gear means;
   a thrust rod linked with one end directly to the crank arm, the other end of the thrust rod being pivotally linked directly to the slat;
   cover means on the thrust rod extending for its length and completing the wing surface when the slat is held in a retracted position;
   an arc-shaped guide rail connected to the slat; and
   a guide means running in engaging relation with the rail and being connected to the wing.

2. The drive mechanism as in claim 1, the gear means being of the planetary gear variety.